United States Patent
Kim et al.

(12) 
(10) Patent No.: US 6,692,874 B2
(45) Date of Patent: Feb. 17, 2004

(54) ELECTROLYTES AND LITHIUM ION BATTERY USING THE SAME

(75) Inventors: Hyeong-Jin Kim, Taejeon (KR); Seung-Il Yoo, Kumi (KR); Jae-Sik Chung, Seongnam (KR)

(73) Assignee: LG Chemical Co., Ltd., Seoul (KR)

( * ) Notice: Subject to any disclaimer, the term of this patent is extended or adjusted under 35 U.S.C. 154(b) by 108 days.

(21) Appl. No.: 09/936,240

(22) PCT Filed: Jan. 10, 2001

(86) PCT No.: PCT/KR01/00036

§ 371 (c)(1),
(2), (4) Date: Sep. 7, 2001

(87) PCT Pub. No.: WO01/52340

PCT Pub. Date: Jul. 19, 2001

(65) Prior Publication Data

US 2003/0087162 A1 May 8, 2003

(30) Foreign Application Priority Data

Jan. 10, 2000 (KR) ............................................. 2000-934

(51) Int. Cl.$^7$ ............................................... H01M 10/40
(52) U.S. Cl. ........................ 429/338; 429/330; 429/331; 429/332
(58) Field of Search ................. 429/330, 331, 429/332, 338; 558/265

(56) References Cited

U.S. PATENT DOCUMENTS

| 2,711,997 A | * | 6/1955 | Treischmann et al. .. 558/265 X |
| 4,840,858 A | * | 6/1989 | Furukawa et al. .......... 429/330 |
| 5,521,027 A |   | 5/1996 | Okuno et al. |
| 5,525,443 A |   | 6/1996 | Okuno et al. |
| 5,626,981 A | * | 5/1997 | Simon et al. ............ 429/331 X |
| 6,010,806 A | * | 1/2000 | Yokoyama et al. .......... 429/330 |
| 6,315,918 B1 | * | 11/2001 | Mita et al. ............... 429/330 X |
| 6,413,678 B1 | * | 7/2002 | Hamamoto et al. .......... 429/332 |

FOREIGN PATENT DOCUMENTS

| EP | 398 689 A2 | 5/1990 | .......... H01M/10/40 |
| JP | 05-290882 | 11/1993 | .......... H01M/10/40 |
| JP | 10-214638 | 8/1998 | .......... H01M/10/38 |
| JP | 10-247519 | 9/1998 | .......... H01M/10/40 |

OTHER PUBLICATIONS

Smart et al., Journal of The Electrochemical Society, Electrolytes for Low–Temperature Lithium Batteries Based on Ternary Mixtures of Aliphatic Carbonates, 1999, pp. 486–492, (month unknown).

Nakajima et al, Journal of Fluorine Chemistry, Effect of fluoroesters on the low temperature electrochemical characteristics of graphite electrode, 1998, pp. 221–227, (month unknown).

* cited by examiner

Primary Examiner—Stephen Kalafut
(74) Attorney, Agent, or Firm—Knobbe Martens Olson & Bear LLP

(57) ABSTRACT

The present invention relates to a lithium ion battery, more particularly to a new electrolyte for a lithium ion battery, the new electrolyte comprising a compound which is either 4-carbomethoxymethyl 1,3-dioxan-2-one or 4-carboethoxymethyl 1,3-dioxan-2-one. Each of these compounds comprises a cyclic ring carbonate structure and a linear carbonate structure. The battery also comprises an anode including graphitized carbon and a cathode including a lithium transition metal oxide, and exhibits a superior charge-discharge life cycle characteristic and low temperature performance.

8 Claims, No Drawings

ELECTROLYTES AND LITHIUM ION BATTERY USING THE SAME

This application claims priority of Korea patent Application No. 2000-000934, filed on Jan. 10, 2000.

BACKGROUND OF THE INVENTION (a) Field of the Invention

The present invention relates to a lithium ion battery, more particularly to a new electrolyte and a lithium ion battery which comprises the same, using an anode including graphitized carbon and a cathode including lithium-containing transition metal oxide.

(b) Description of the Related Art

Ever since the lithium ion liquid secondary battery was first commercialized by Sony Co., the lithium ion liquid battery has been used increasingly in portable computers and cellular phones etc., instead of the lithium ion secondary batteries of prior art, as it has a higher energy density. The lithium ion liquid secondary battery comprises an anode including carbonaceous material as an anode active material and a cathode including a metal oxide of $LiCoO_2$ etc. as a cathode active material, and is prepared by intercalating a porous polyolefin-based separator between the anode and the cathode, then by injecting a non-aqueous electrolyte having a lithium salt of $LiPF_6$ etc. When the battery charges, the lithium ions of the cathode active material are released and then are inserted into the carbon layer of the anode. When the battery discharges, the lithium ions of the carbon layer of the anode are released and then are inserted into the cathode active material. The non-aqueous electrolyte plays a mediating role moving the lithium ions between the anode and the cathode. The electrolyte should be stable within the scope of the operation voltage of the battery, and be able to transfer the ion with sufficiently fast velocity.

As an electrolyte, U.S. Pat. Nos. 5,521,027 and 5,525,443 disclose an admixture electrolyte of a linear carbonate and cyclic carbonate. The cyclic carbonate has a large polarity and thus is sufficiently capable of dissociating lithium, but has low ion conductivity due to the large viscosity. Therefore, in these patents, mixing linear carbonate with a low polarity and a low viscosity reduces the viscosity of the electrolyte comprising the cyclic carbonate.

The above cyclic carbonate includes carbonates such as ethylene carbonate (EC), propylene carbonate (PC), vinylene carbonate (VC), butylene carbonate (BC) etc. PC has a good low temperature performance due to a low freezing point of −49° C. However, if an anode uses graphitized carbon of a large capacity, there is the problem of a sudden reaction between PC and the anode when the battery is charging. Thus, EC is commonly used, as it forms the most stable protecting film among the cyclic carbonates in a battery comprising an anode using graphitized carbon. However, if EC is used in a large amount, the low temperature performance of the electrolyte is abruptly deteriorated due to the EC's high melting point of 37° C. To resolve this problem, it is common to use a two-component electrolyte by mixing in a linear carbonate having a low melting point and a low viscosity as a second component with the EC.

The above linear carbonates include carbonates such as dimethyl carbonate (DMC), diethyl carbonate (DEC), and ethyl methyl carbonate (EMC) etc. If EMC, which has the lowest melting point of the listed carbonates, namely −55° C., is used, the battery exhibits excellent low temperature performance.

However, merely mixing cyclic carbonate and linear carbonate does not satisfy the need for a high capacity and low temperature performance in the lithium ion battery.

In fact, there has been research directed to improving the low temperature performance of an electrolyte comprising EC, by adding another electrolyte or new additives to the electrolyte of the prior art. The literature (J. Electrochem. Soc. 146(2), 485, 1999) discloses that an electrolyte of a three-component system prepared by mixing EC, diethyl carbonate (DEC), and dimethyl carbonate (DMC) has an excellent low temperature performance, better than the two-component system. Other literature (J. Fluorine Chem. 87 (1998) 221) discloses that low temperature performance is improved by adding $CHF_2COOCH_3$ to an electrolyte comprising EC and DEC.

If additives are added to the electrolyte as in the above methods, ion conductivity can be improved due to a lower freezing point and lower viscosity at low temperature, as the molecules of the electrolyte are prevented from forming a regular configuration with each other. That is if an electrolyte of more than the three components is prepared, wherein a suitable organic material as the third component is further added to the electrolyte of the two-component system, there is the effect of a freezing point depression when the electrolyte has a suitable composition, and also the effect of improving the charge performance at low temperature due to a reduction of viscosity at low temperature.

In fact, the electrolyte must be shown to be electrochemically stable within the scope of the operation voltage of the battery, and must be shown to have low reactivity with the graphitized carbon, and must not shorten the charge-discharge cyclic life by forming a stable protecting film on the anode. However, there has heretofore been no electrolyte which is known to satisfy the above condition.

SUMMARY OF THE INVENTION

It is an object of the present invention to provide a new compound that is electrochemically stable within the scope of the operation voltage of the battery, as the compound has both a cyclic carbonate structure and a linear carbonate structure in the molecule. The compound has a low reactivity with graphitized carbon of high electric capacity, and does not shorten a charge-discharge cyclic life by forming a stable protective film on an anode and thus can be used as a component of electrolyte.

It is other object to provide an electrolyte comprising the above new compound.

It is another object of the present invention to provide a lithium ion battery having a large electric capacity and a superior low-temperature performance comprising an anode including a graphitized carbon and a cathode including a lithium-containing transition metal oxide, a porous separator, and an electrolyte including a lithium salt and the above new compound.

DETAILED DESCRIPTION OF THE PREFERRED EMBODIMENTS

In order to achieve the above objects and others, the present invention provides a compound shown in Formula 1:

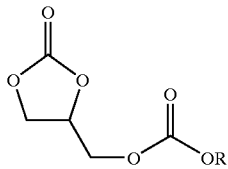

[Formula 1]

wherein, R is methyl or ethyl group.

The present invention also provides an electrolyte comprising:

a) a lithium salt; and
b) the following compound shown in Formula 1 comprising both a cyclic carbonate structure and a linear carbonate structure in molecule:

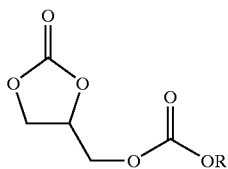

[Formula 1]

wherein, R is methyl or ethyl group.

The present invention also provides a lithium ion battery comprising an anode including graphitized carbon as an active material, capable of absorbing and releasing lithium ions reversibly, a cathode including a lithium-containing transition metal oxide as an active material, capable of absorbing and releasing lithium ions reversibly, a porous separator, and an electrolyte, the electrolyte comprising:

a) a lithium salt; and
b) the compound shown in Formula 1 comprising both a cyclic carbonate structure and a linear carbonate structure in molecule:

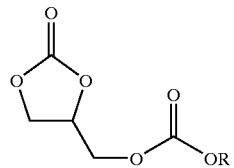

[Formula 1]

wherein, R is methyl or ethyl group.

The present invention is described in detail as follows.

The present invention relates to the compound shown in Formula 1 as an additive for an electrolyte of a lithium ion battery comprising an anode including a graphitized carbon, a cathode including a lithium-containing transition metal oxide, a porous separator, and a lithium salt-containing electrolyte.

Since the compound comprises both a cyclic carbonate structure and a linear carbonate structure in the molecule, the battery can possess a large capacity and improved low temperature performance when the compound is used for the lithium ion in a secondary battery including a lithium salt. In particular, the compound is electrochemically stable within scope of the operation of the battery, has low reactivity to graphitized carbon, and forms a stable protecting film due to a small possibility of insertion of the carbonaceous material of an anode together with the lithium ion, as the molecular size of the compound is relatively larger than those of EC and PC.

In the compound shown in Formula 1 comprising both a cyclic carbonate structure and a linear carbonate structure in the molecule, when R is methyl group, the compound is 4-carbomethoxymethyl-1,3-dioxolan-2-one; and when R is ethyl group, the compound is 4-carboethoxymethyl-1,3-dioxolan-2-one.

The compound shown in Formula 1 of the present invention may be prepared according to the following Scheme 1: sodium is immediately dissolved by adding in glycerol-1-allyether, then diethyl carbonate is added to obtain 4-allyloxymethyl-1,3-dioxolan-2-one as a first intermediate product, and a palladium carbon and p-toluene sulfonic acid are added to the first intermediate product. Then the mixture is reacted and distilled to obtain 4-hydroxymethyl-1,3-dioxolan-2-one as a second intermediate product, and the second intermediate product is reacted with methyl chloroformate or ethyl chloroformate, then extracted with methylene chloride solvent to obtain the compound shown in Formula 1.

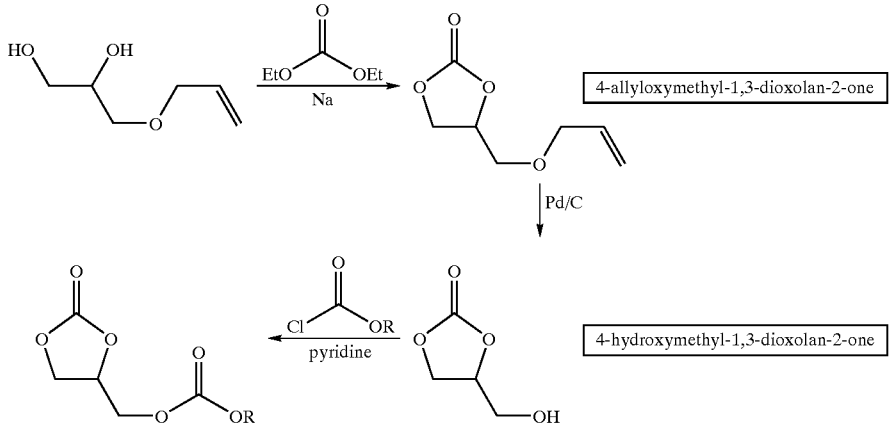

[Scheme 1]

The compound shown in Formula 1 of the present invention may be used in an electrolyte of a lithium ion battery comprising only a lithium salt, or an electrolyte of a cyclic carbonate or a linear carbonate as well as a lithium salt. In particular, when the compound is used as a third component in an electrolyte comprising a cyclic carbonate and a linear carbonate in a lithium ion battery including graphitized carbon of high capacity, the lithium ion battery may exhibit a high capacity of graphitized carbon, a superior charge-discharge cyclic life and a superior low temperature performance by reducing irreversible capacity.

The electrolyte comprising the compound of the present invention is a non-aqueous solution containing a lithium salt. In particular, the lithium salt is preferably selected from the group consisting of $LiClO_4$, $LiCF_3SO_3$, $LiPF_6$, $LiBF_4$, $LiAsF_6$, and $LiN(CF_3SO)_2$. The electrolyte of the present invention may include an ester or a carbonate compound which is at least one selected from the group consisting of ethylene carbonate (EC), propylene carbonate (PC), butylene carbonate (BC), vinylene carbonate (VC), diethyl carbonate (DEC), dimethyl carbonate (DMC), ethylmethyl carbonate (EMC), -butyrolactone, sulfolane, methyl acetate (MA), methyl propionate (MP), and methyl formate (MF).

The present invention provides a lithium ion battery comprising an anode including high capacity graphitized carbon as an active material, capable of absorbing and releasing lithium ions reversibly, a cathode including lithium-containing transition metal oxide as an active material, capable of absorbing and releasing lithium ions reversibly, a porous separator, and an electrolyte containing a lithium salt and the compound shown in the above Formula 1.

To provide the lithium ion battery, the graphitized carbon employed has preferably a interplanar spacing (d002) of less than 0.338 nm as measured by X-ray diffraction of the carbonaceous material, and a specific surface area of less than 10 $m_2$/g as measured by the Brunauer-Emmett-Teller (BET) method. The lithium-containing transition metal oxide is preferably selected from the group consisting of $LiCoO_2$, $LiNiO_2$, $LiMn_2O_4$, and $LiNi_{1-x}Co_xO_2$ (wherein, $0<x\leq1$). In particular, the above battery consists of an anode composed of an active carbonaceous material and polyvinylidene as a binder resin, a cathode composed of a lithium-containing transition metal oxide, a conductive agent, and polyvinylidene difluoride as a binder resin. The elements of the battery may be prepared by general methods. A lithium ion battery of a high capacity and a superior low temperature performance may be more easily prepared by using the compound shown in Formula 1 of the present invention in the electrolyte.

Hereinafter, the present invention is described more in detail through EXAMPLES and COMPARATIVE EXAMPLES. However, the following EXAMPLES are only for the understanding of the present invention, and the present invention is not limited to the following EXAMPLES.

EXAMPLES

Example 1

(Preparation of 4-carbomethoxymethyl-1,3-dioxolan-2-one)

To 200 g of glycerol-1-allylether (Acros Company), 1.74 g of fresh sodium was added. After sodium was dissociated completely, 196 g of diethyl carbonate was added for 1 hour, and then the reaction mixture was stirred at 130° C. for 12 hrs. After completing the reaction, the mixture was separated into two layers with ethyl ether and distilled water, the combined ethyl ether layer was fractionated to obtain 133 g of 4-allyloxymethyl-1,3-dioxolan-2-one as a first intermediate product.

133 g of a first intermediate product was added to 1640 ml of methanol, and 19.95 g of 10 wt % of palladium carbon and 13.3 g of p-toluene sulfonic acid were added with stirring under the atmosphere of $N_2$, and the mixture was reacted at room temperature for 48 hrs. The resultant reaction mixture was passed through celite 545 to obtain a solution. Vacuum distillation of this solution gave 73 g of 4-hydroxymethyl-1,3-dioxolan-2-one as a second intermediate product.

To 73 g of 4-hydroxymethyl-1,3-dioxolan-2-one was added 63.3 g of pyridine with stirring and 75.6 g of methyl chloroformate was added at 0° C. for 1 hr, then the reaction mixture stirred at room temperature for 16 hrs. The reaction solution was passed through a glass filter to remove pyridine HCl salts, and then extracted with methylene chloride and distilled water. Recrystallization was carried out in toluene to obtain 30 g of 4-carbomethoxymethyl-1,3-dioxolan-2-one as a final product.

Example 2

(Preparation of 4-carboethoxymethyl-1,3-dioxolan-2-one)

34 g of 4-carboethoxymethyl-1,3-dioxolan-2-one was obtained by the same procedure as in example 1 except that 80 g of ethyl chloroformate instead of methyl chloroformate was added to 4-hydroxymethyl-1,3-dioxolan-2-one as a second intermediate material.

Example 3

(Preparation of an Electrolyte)

30 ml of an electrolyte was prepared with mixing in a volume ratio of EC:4-carbomethoxymethyl-1,3-dioxolan-2-one (Example 1):EMC=41.65: 8.35:50 and adding 1 M $LiPF_6$ solution in glove box. The EC and EMC were respectively F-EC and F-EMC, the products of Mitsubishi Chem. Company.

Example 4

(Preparation of an Electrolyte)

30 ml of an electrolyte was prepared with mixing in a volume ratio of EC:4-carboethoxymethyl-1,3-dioxan-2-one (Example 2):EMC=41.65: 8.35:50 and adding 1 M $LiPF_6$ solution in glove box. The EC and EMC were respectively F-EC and F-EMC, the products of Mitsubishi Chem. Company.

Comparative Example 1

(Preparation of an Electrolyte)

30 ml of an electrolyte was prepared with mixing in the volume ratio of EC:PC:EMC=41.65:8.35:50 and adding 1 M $LiPF_6$ solution in glove box. The EC, PC and EMC were respectively F-EC, F-PC and F-EMC, the products of Mitsubishi Chem. Company.

Comparative Example 2

(Preparation of an Electrolyte)

30 ml of an electrolyte was prepared with mixing in a volume ratio of EC:EMC=50:50 and adding 1 M $LiPF_6$ solution in glove box. The EC and EMC were respectively F-EC and E-EMC, the products of Mitsubishi Chem. Company.

Example 5

(Preparation of Lithium Ion Battery)

An anode was prepared by mixing 93 wt % of carbonaceous active material (Osaka gas Company, MCMB-10-28), and 7 wt % of polyvinylidene difluoride (PVDF; Kynar 761 of Elf Atochem Company) in N-methyl-2-pyrrolidinone (NMP) as solvent in mixer (Ika Company) for 2 hrs to obtain an anode slurry, and then by coating the slurry on a copper foil current collector, and followed by drying at 130° C.

A cathode was prepared by mixing 91 wt % of $LiCoO_2$, 3 wt % of PVDF (Kynar 761), 6 wt % of conductive carbon (Lonza Company, KS-6) in NMP in mixer (Ika Company) for 2 hrs to obtain a cathode slurry, and then by coating the slurry on aluminum foil current collector, and followed by drying at 130° C.

18650 cylindrical type of lithium ion batteries were fabricated by winding an anode, a cathode, and a separator (celgard 2400 of Hoechst Celanese Company) between the anode and the cathode, and followed by injecting electrolytes of Comparative Examples 1 and 2, and Examples 3 and 4.

Evaluation of the Battery

A charge-discharge experiment was carried out, wherein the battery was charged to 4.2 V, and then discharged to 3 V at the rate of 0.5 C. at room temperature. Then, an experiment to determine low temperature performance was carried out, wherein the battery was left at −20° C. for 4 hrs, and then discharged to 2.5 V at the rate of 0.2 C. The results of the charge-discharge experiments are shown in Table 1.

The battery using the electrolyte of Comparative Example 1 was shown to have good low-temperature performance due to the use of PC, but was shown to have low capacity and a poor charge-discharge cyclic life. Further, the battery using the electrolyte of Comparative Example 2 was shown to have a large capacity, but a poor charge-discharge cyclic life. In comparison, the battery using the electrolytes of Example 3 (comprising the compound of Example 1), and Example 4 (comprising the compound of Example 2) was shown to have excellent performance in electric capacity, charge-discharge cyclic life, and low temperature performance.

TABLE 1

| | Volume ratio of an electrolyte component (v %) | | | | | Evaluation | | |
|---|---|---|---|---|---|---|---|---|
| | EC | PC | Compound of Example 1 | Compound of Example 2 | EMC | Initial Capacity (mAh) | Capacity after 200 cyclic (mAh) | Discharge efficiency at −20° C. (%) |
| Example 3 | 41.7 | 0 | 8.3 | 0 | 50 | 1560 | 1320 | 60 |
| Example 4 | 41.7 | 0 | 0 | 8.3 | 50 | 1560 | 1300 | 58 |
| Comparative example 1 | 41.7 | 8.3 | 0 | 0 | 50 | 1450 | 1160 | 66 |
| Comparative example 2 | 50 | 0 | 0 | 0 | 50 | 1570 | 1330 | 10 |

What is claimed is:

1. An electrolyte comprising:
   a) a lithium salt; and
   b) a compound as shown in Formula 1 comprising both a cyclic carbonate structure and a linear carbonate structure:

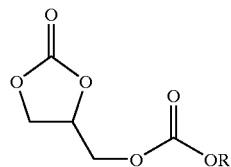

[Formula 1]

wherein, R is methyl or ethyl.

2. The electrolyte as claimed in claim 1, wherein the electrolyte comprises c) an ester or a carbonate compound selected from the group consisting of ethylene carbonate (EC), propylene carbonate (PC), butylene carbonate (BC), vinylene carbonate (VC), diethylene carbonate (DEC), dimethylene carbonate (DMC), ethylmethylcarbonate (EMC), γ-butyrolactone, sulfolane, methyl acetate (MA), methyl propionate (MP), and methylformate (MF).

3. The electrolyte as claimed in claim 1, wherein the lithium salt is selected from the group consisting of $LiClO_4$, $LiCF_3SO_3$, $LiPF_6$, $LiBF_4$, $LiAsF_6$, and $LiN(CF_3SO_2)_2$.

4. A lithium ion battery comprising an anode comprising graphitized carbon as an active material, capable of absorbing and releasing lithium ions reversibly, a cathode comprising lithium-containing transition metal oxide as an active material, capable of absorbing and releasing lithium ions reversibly, a porous separator, and an electrolyte, the electrolyte comprising:

a) a lithium salt; and
b) a compound as shown in Formula 1 comprising both a cyclic carbonate structure and a linear carbonate structure:

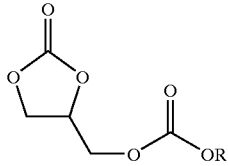

[Formula 1]

wherein, R is methyl or ethyl.

5. The lithium ion battery as claimed in claim 4, wherein the electrolyte comprises c) an ester or a carbonate compound selected from the group consisting of ethylene carbonate (EC), propylene carbonate (PC), butylene carbonate (BC), vinylene carbonate (VC), diethylene (DEC), dimethylene carbonate (DMC), ethylmethyl carbonate (EMC), γ-butyrolactone, sulfolane, methyl acetate (MA), methyl propionate (MP), and methylformate (MF).

6. The lithium ion battery as claimed in claim 4, wherein the lithium salt is selected from the group consisting of $LiClO_4$, $LiCF_3SO_3$, $LiPF_6$, $LiBF_4$, $LiAsF_6$, and $LiN(CF_3SO_2)_2$.

7. The lithium ion battery as claimed in claim 4, wherein the graphitized carbon has an interplanar spacing (d002) of less than 0.338 nm as measured by X-ray diffraction, and a specific surface area of less than 10 m²/g as measured by a Brunauer-Emmett-Teller method.

8. The lithium ion battery as claimed in claim 4, wherein the lithium-containing transition metal oxide is selected from the group consisting of $LiCoO_2$, $LiNiO_2$, $LiMn_2O_4$, and $LiNi_{1-x}Co_xO_2$ ($0<x\leq1$).

* * * * *